United States Patent
Kim et al.

(10) Patent No.: US 9,059,470 B2
(45) Date of Patent: Jun. 16, 2015

(54) METHOD OF PREPARING CATHODE FOR FUEL HAVING TWO KINDS OF WATER-REPELLENCY

(71) Applicant: LG CHEM, LTD., Seoul (KR)

(72) Inventors: Hyuk Kim, Daejeon (KR); Won-Ho Lee, Daejeon (KR); Chang-Song Lee, Seoul (KR); Seong-Uk Jeong, Seoul (KR); Sang-Hyun Lee, Namyangiu-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/890,832

(22) Filed: May 9, 2013

(65) Prior Publication Data

US 2013/0316075 A1 Nov. 28, 2013

Related U.S. Application Data

(62) Division of application No. 12/682,868, filed as application No. PCT/KR2008/005899 on Oct. 8, 2008, now Pat. No. 8,460,836.

(30) Foreign Application Priority Data

Oct. 16, 2007 (KR) .......................... 10-2007-0104206

(51) Int. Cl.
*B05D 5/12* (2006.01)
*H01M 4/88* (2006.01)
(Continued)

(52) U.S. Cl.
CPC .......... *H01M 4/8828* (2013.01); *H01M 4/8605* (2013.01); *H01M 4/8668* (2013.01); *H01M 4/8807* (2013.01); *H01M 4/881* (2013.01); *H01M 4/926* (2013.01);
(Continued)

(58) Field of Classification Search
USPC ................... 427/96.7, 96.8, 98.4, 115, 421.1; 502/101, 185; 429/523–526
See application file for complete search history.

(56) References Cited

U.S. PATENT DOCUMENTS 7,413,826 B2 * 8/2008 Ueda et al. ..................... 429/479
7,901,832 B2 * 3/2011 Trabold et al. ................. 429/512
(Continued)

FOREIGN PATENT DOCUMENTS

CN 1783558 6/2006
CN 1983698 6/2007
(Continued)

OTHER PUBLICATIONS

Database WPI Week 200482, Thomson Scientific, London, GB AN 2004-830504, XP002601556.

*Primary Examiner* — Brian K Talbot
(74) *Attorney, Agent, or Firm* — McKenna Long & Aldridge LLP

(57) ABSTRACT

A cathode for a fuel cell includes a gas diffusion layer contacting with a separator having a channel and a catalyst layer interposed between the gas diffusion layer and an electrolyte membrane. The catalyst layer of the cathode has two portions with different water-repelling properties, and a portion of the catalyst layer that does not face a channel has a higher water-repelling property than a portion that faces a channel. This cathode controls a water-repelling property of the catalyst layer differently according to locations, so it is possible to keep an amount of moisture in an electrode in a suitable way and to restrain generation of flooding, thereby improving the performance of the cell.

10 Claims, 3 Drawing Sheets

(51) Int. Cl.
  *H01M 4/86*   (2006.01)
  *H01M 4/92*   (2006.01)
  *H01M 8/04*   (2006.01)
  *H01M 8/10*   (2006.01)

(52) U.S. Cl.
  CPC ..... *H01M 8/04119* (2013.01); *H01M 8/04149* (2013.01); *H01M 8/04171* (2013.01); *H01M 8/1023* (2013.01); *H01M 8/1039* (2013.01); *H01M 2004/8689* (2013.01); *Y02E 60/50* (2013.01)

(56) References Cited

U.S. PATENT DOCUMENTS

| | | | |
|---|---|---|---|
| 8,182,964 B2 * | 5/2012 | Son et al. | 429/529 |
| 2002/0192530 A1 * | 12/2002 | Kabumoto et al. | 429/38 |
| 2004/0166397 A1 * | 8/2004 | Valdez et al. | 429/44 |
| 2005/0181264 A1 * | 8/2005 | Gu et al. | 429/38 |
| 2006/0099483 A1 | 5/2006 | Min et al. | |
| 2007/0003815 A1 * | 1/2007 | Vyas et al. | 429/38 |
| 2007/0037936 A1 * | 2/2007 | Mihan et al. | 526/64 |
| 2007/0178367 A1 | 8/2007 | Ueda et al. | |
| 2008/0032181 A1 * | 2/2008 | Yamamoto | 429/41 |
| 2008/0274390 A1 * | 11/2008 | Ueda et al. | 429/34 |
| 2008/0292940 A1 * | 11/2008 | Xie | 429/34 |
| 2009/0280377 A1 * | 11/2009 | Ueda et al. | 429/30 |
| 2010/0062305 A1 | 3/2010 | Kadotani et al. | |

FOREIGN PATENT DOCUMENTS

| | | |
|---|---|---|
| JP | 15-197203 A | 7/2003 |
| JP | 17-293867 A | 12/2005 |
| JP | 2008-243548 | 10/2008 |
| KR | 10-2004-0070164 A | 8/2004 |

* cited by examiner

METHOD OF PREPARING CATHODE FOR FUEL HAVING TWO KINDS OF WATER-REPELLENCY

This application is a Divisional Application of U.S. patent application Ser. No. 12/682,868, filed on Aug. 2, 2010, which is a National Stage entry of International Application No. PCT/KR2008/005899, filed on Oct. 8, 2008, which claims priority to Korean Application No. 10-2007-0104206, filed on Oct. 16, 2007, which are all hereby incorporated by reference in their entireties.

TECHNICAL FIELD

The present invention relates to a cathode for a fuel cell having two kinds of water-repellencies, a method for preparing the same, and a membrane electrode assembly and a fuel cell having the same, and more particularly to a cathode for a fuel cell capable of controlling water-repellency of a catalyst layer, a method for preparing the same, and a membrane electrode assembly and a fuel cell having the same.

BACKGROUND ART

Recently, as depletion of conventional energy resources such as oil or coal is foreseen, interest in an alternative energy is increasing. A fuel cell is one of the alternative energy, and advantageously has a high efficiency, does not emit pollutants of $NO_x$ and $SO_x$ and uses a fuel that is abundant in quantity, and therefore, the fuel cell attracts public attention.

The fuel cell is a power generation system that converts chemical energy of a fuel and an oxidant to electrical energy, and typically hydrogen and hydrocarbon, for example methanol or butane is used as a fuel, and oxygen is used as an oxidant.

In the fuel cell, a membrane electrode assembly (MEA) is the basic unit for generating electricity, and includes an electrolyte membrane and anode and cathode electrodes formed at opposite sides of the electrolyte membrane. FIG. 1 illustrates the principle for generating electricity of a fuel cell, and Chemical FIG. 1 represents a reaction formula of a fuel cell in the case that hydrogen is used as a fuel. Referring to FIG. 1 and Chemical FIG. 1, an oxidation reaction of a fuel occurs at an anode electrode to generate hydrogen ions and electrons, and the hydrogen ions move to a cathode electrode through an electrolyte membrane. The hydrogen ions transmitted through the electrolyte membrane and the electrons react with oxygen (oxidant) at the cathode electrode to generate water. This reaction causes the electrons to move to an external circuit.

Chemistry FIG. 1
Anode electrode: $H_2 \rightarrow 2H^+ + 2e^-$
cathode electrode: $\frac{1}{2}O_2 + 2H^+ + 2e^- \rightarrow H_2O$
Reaction formula: $H_2 + \frac{1}{2}O_2 \rightarrow H_2O$ FIG. 2 illustrates a general configuration of a membrane electrode assembly for a fuel cell. Referring to FIG. 2, a membrane electrode assembly for a fuel cell includes an electrolyte membrane, and an anode electrode and a cathode electrode located at the opposite sides of the electrolyte membrane. The anode and cathode electrodes respectively include a catalyst layer and a gas diffusion layer. The gas diffusion layer includes an electrode substrate and a microporous layer formed on the electrode substrate.

In the fuel cell, the moisture that is also a resultant material of reaction in an electrode assists ion transfer, but an excessive amount of moisture may block the micro pores in the catalyst layer or the gas diffusion layer. Namely, the moisture discharging ability in the electrode surface of a fuel cell is a factor determining performance of the cell. Thus, the moisture introduced into the electrode or the moisture generated in the electrode should be controlled suitably. If moisture is not discharged suitably, flooding occurs, which decreases the three-phase reaction sites and reduces an activation area of catalyst, thereby deteriorating the efficiency of the fuel cell.

However, a catalyst layer of a conventional fuel cell membrane electrode assembly is made by coating with one kind of ink including a catalyst and an ionomer, so the same catalyst layer is formed entirely. Thus, it was difficult to control water repelling in the catalyst layer.

In this regards, Japanese Laid-open Patent Publication No. 2006-286330 discloses a method for making an electrode with different hydrophile properties in a catalyst layer by surface-reforming catalyst particles with compounds with different hydrophile properties, but this method does not still solve the above problems in an effective way.

DISCLOSURE OF INVENTION

Technical Problem

Therefore, an object of the present invention is to provide a cathode for a fuel cell, which may keep moisture in an electrode to a suitable level by controlling the degree of water repelling in a catalyst layer.

Technical Solution

In order to accomplish the above object, the present invention provides a cathode for a fuel cell, which includes a gas diffusion layer contacting with a separator having a channel and a catalyst layer interposed between the gas diffusion layer and an electrolyte membrane, wherein the catalyst layer of the cathode has two portions with different water-repelling properties, and a portion of the catalyst layer that does not face a channel has a higher water-repelling property than a portion that faces a channel.

Inventors found that Japanese Laid-open Patent Publication No. 2006-286330 discloses that a catalyst layer has regions with different hydrophile properties, but its effect is insufficient since correlation between channel location and moisture control in the catalyst layer is overlooked. In this reason, as shown in FIG. 5, in the cathode for a fuel cell of the present invention, a water-repelling property is enhanced in a portion 22 of a separator 210, which does not faces a channel, namely in a portion of catalyst layers 203, 205 corresponding to a gas diffusion layer 208 pressed by the separator. Thus, moisture may be more easily discharged to suitably keep moisture in a cell, thereby improving the performance of the cell. In the electrode of the present invention, the difference of water-repelling properties between the portion facing a channel and the portion not facing a channel may be considered as appropriate when a difference of contact angles to water is 2° to 20°, but the present invention is not limited thereto.

The portion of the catalyst layer in the cathode of the present invention, which faces a channel, may employ a catalyst layer generally used in the art, and it may include, for example, a metal catalyst or a metal catalyst on a carbon-based support, and a polymer ionomer.

The portion of the catalyst layer in the cathode of the present invention, which does not face a channel and has a higher water-repelling property than the portion facing a channel, may further include a hydrophobic polymer-based water-repelling enhancer used in the art in addition to a conventional catalyst layer so as to improve the water-repelling property. For example, this portion may include a metal catalyst or a metal catalyst on a carbon-based support; a polymer ionomer, and a hydrophobic polymer-based water-repelling enhancer selected from the group consisting of polytetrafluoroethylene, polychlorotrifluoroethylene and fluorinated ethylene propylene copolymer. Here, a weight ratio of the metal catalyst to the hydrophobic polymer-based water-repelling enhancer may be set to 1:0.02 to 0.40 as necessary by those having ordinary skill in the art, but the present invention is not limited thereto.

In another aspect of the present invention, there is also provided a method of preparing a cathode for a fuel cell, which includes (S1) preparing a first catalyst layer forming ink and a second catalyst layer forming ink that further contains a hydrophobic polymer-based water-repelling enhancer in addition to the first catalyst layer forming ink; and (S2) spraying the first and second catalyst layer forming inks to an electrolyte membrane or a gas diffusion layer by means of ink jet spraying such that the first catalyst layer forming ink is sprayed to a portion that faces a channel and the second catalyst layer forming ink is sprayed to a portion that does not face a channel.

In this regards, Japanese Laid-open Patent Publication No. 2006-286330 discloses a method for controlling hydrophile properties in a catalyst layer by surface-reforming catalyst particles, but the inventors found that this conventional technique needs an additional process for surface-reforming catalyst particles. However, in the method of the present invention, the hydrophobic polymer-based water-repelling enhancer capable of improving water-repelling property of a catalyst layer is added and mixed while the catalyst layer forming ink is prepared, so this method is very simple and does not need any separate process.

The first catalyst layer forming ink may adopt any ink generally used in the art, and for example it may include a metal catalyst or a metal catalyst on a carbon-based support; a polymer ionomer; and a solvent. The second catalyst layer forming ink may be prepared by further adding a hydrophobic polymer-based water-repelling enhancer used in the art to a conventional catalyst layer forming ink so as to improve the water-repelling property. For example, the second catalyst layer forming ink may include a metal catalyst or a metal catalyst on a carbon-based support; a polymer ionomer; a hydrophobic polymer-based water-repelling enhancer selected from the group consisting of polytetrafluoroethylene, polychlorotrifluoroethylene and fluorinated ethylene propylene copolymer; and a solvent. Also, a weight ratio of the metal catalyst to the hydrophobic polymer-based water-repelling enhancer may be set to 1:0.02 to 0.40 as necessary by those having ordinary skill in the art, but the present invention is not limited thereto.

In this method, the ink spraying process may be executed in a thermally treated state if required.

The above cathode may be used for a membrane electrode assembly or a fuel cell.

BEST MODE FOR CARRYING OUT THE INVENTION

Figure 1:
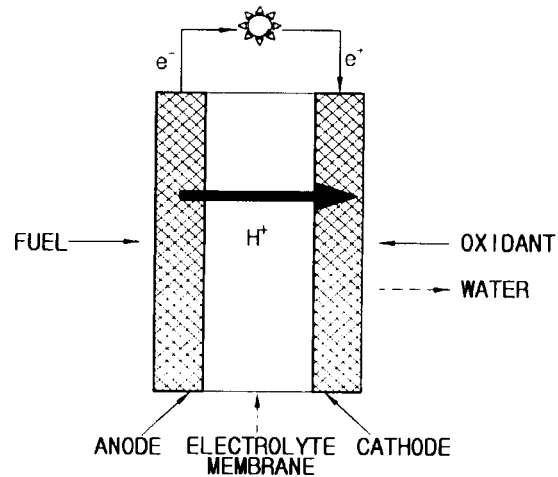
FIG. 1 is a schematic view illustrating the principle for generating electricity of a fuel cell.

Hereinafter, an electrode for a fuel cell of the present invention will be described in detail according to its preparing method. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

First, a first catalyst layer forming ink and a second catalyst layer forming ink further containing a hydrophobic polymer-based water-repelling enhancer in addition to the first catalyst layer forming ink are prepared (S1).

The first catalyst layer forming ink according to the present invention may be any catalyst layer forming ink used in the art. For example, the catalyst layer forming ink may include a metal catalyst or a metal catalyst on a carbon-based support; a polymer ionomer; and a solvent.

The metal catalyst may be representatively any one selected from the group consisting of platinum, ruthenium, osmium, platinum-ruthenium alloy, platinum-osmium alloy, platinum-palladium alloy and platinum-transition metal alloy, or their mixtures, however the present invention is not limited thereto.

The carbon-based support may be a carbon-based material, preferably any one selected from the group consisting of graphite, carbon black, acetylene black, denka black, ketjen black, activated carbon, mesoporous carbon, carbon nanotube, carbon nano fiber, carbon nano horn, carbon nano ring, carbon nano wire, fullerene (C60) and Super-P, or their mixtures.

The polymer ionomer may be representatively a nafion ionomer or a sulfonated polymer such as sulfonated polytrifluorostyrene.

The solvent may be any one selected from the group consisting of water, butanol, isopropanol, methanol, ethanol, n-propanol, n-butyl acetate and ethylene glycol, or their mixtures.

The second catalyst layer forming ink according to the present invention may be prepared in the same way as the first catalyst layer forming ink, except that a hydrophobic polymer-based water-repelling enhancer is added. For example, the second catalyst layer forming ink includes a metal catalyst or a metal catalyst on a carbon-based support; a polymer ionomer; a hydrophobic polymer-based water-repelling enhancer selected from the group consisting of polytetrafluoroethylene, polychlorotrifluoroethylene and fluorinated ethylene propylene copolymer; and a solvent.

The content of the hydrophobic polymer-based water-repelling enhancer added to the second catalyst layer forming ink may be controlled as necessary through sufficient experiments. For example, a weight ratio of the metal catalyst and the hydrophobic polymer-based water-repelling enhancer may be set to 1:0.02 to 0.40. If the weight ratio of hydrophobic polymer-based water-repelling enhancer to metal catalyst is 0.02 or above, the water-repelling effect is great. However, if the weight ratio exceeds 0.40, an increase rate of water-repelling effect is not good in comparison to the added amount of hydrophobic polymer-based water-repelling enhancer, and mass transfer may be deteriorated. After the ink is prepared as mentioned above, the first and second catalyst layer forming inks are sprayed onto an electrolyte membrane or a gas diffusion layer by means of ink jet spraying. At this time, the first catalyst layer forming ink is sprayed to a portion facing a channel, and the second catalyst layer forming ink is sprayed to a portion not facing the channel, thereby forming a catalyst layer (S2).

Figure 3:
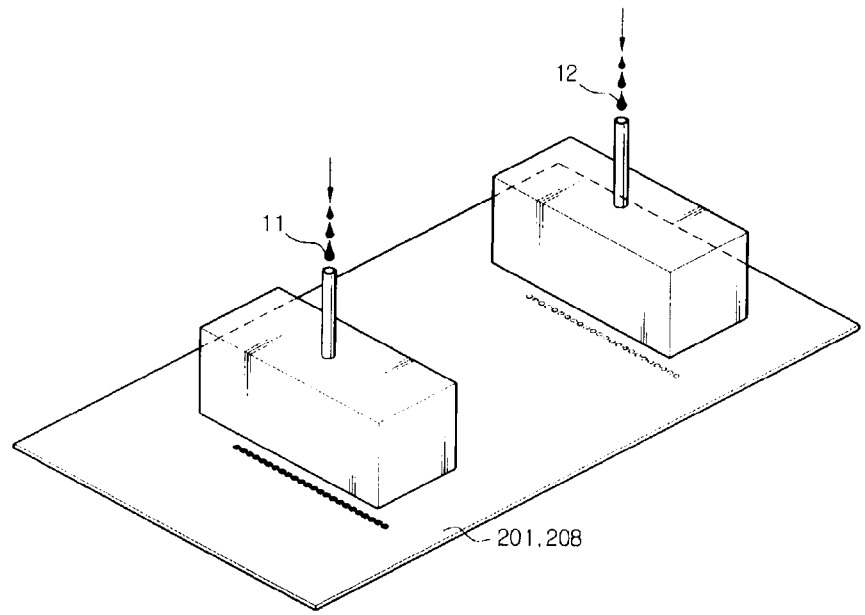
FIG. 3 is a schematic view illustrating that a first catalyst layer forming ink and a second catalyst layer forming ink are respectively sprayed according to the present invention.
Figure 4:
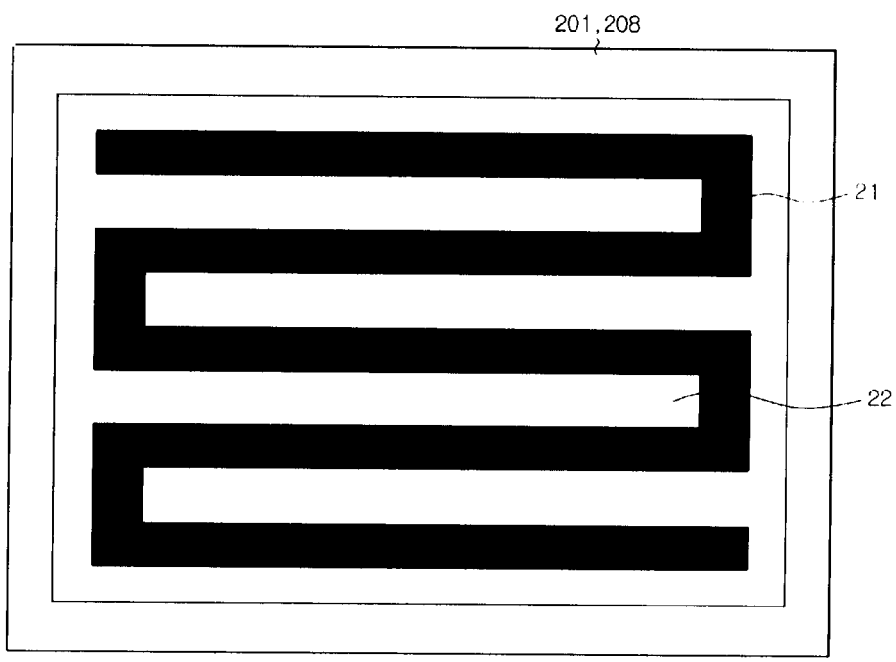
FIG. 4 is a plane view illustrating schematically that a catalyst layer is formed according to the present invention.

As shown in FIG. 3, a first catalyst layer forming ink 11 and a second catalyst layer forming ink 12 are sprayed onto an electrolyte membrane 201 or a gas diffusion layer 208. Ink jet spraying uses the related software to adjust a spray location of inkdrops very precisely, and thus individual inkdrops of the first catalyst layer forming ink 11 and the second catalyst layer forming ink 12 may be sprayed onto preset locations of the electrolyte membrane 201 or the gas diffusion layer 208. Thus, as shown in FIG. 4, it is possible to spray the first catalyst layer forming ink to a portion 21 facing a channel and to spray the second catalyst layer forming ink to a portion 22 not facing the channel.

Figure 5:
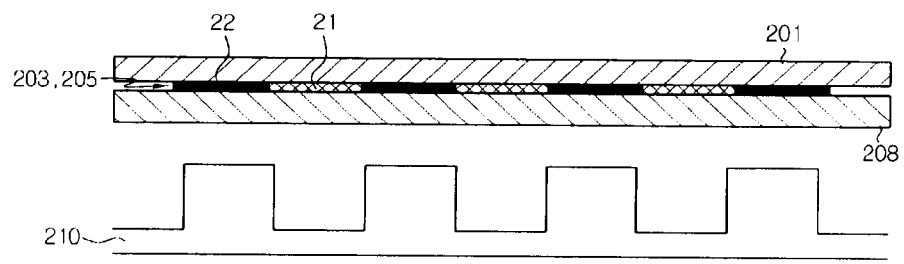
FIG. 5 is a cross-sectional view illustrating schematically that a cathode according to the present invention is formed.

As shown in FIG. 5, the portion 22 of the catalyst layer, not facing the channel, receives a pressure by a non-channel portion of a separator 210 contacting with a membrane electrode assembly, so pores in the gas diffusion layer 208 are reduced. If pores in the gas diffusion layer 208 are reduced, moisture is not easily discharged, so a moisture concentration of catalyst layers 203, 205 corresponding to that portion is changed differently from moisture concentrations of other regions. Thus, the catalyst layers 203, 205 of the present invention are configured such that the portion 22 not facing the channel has higher water-repelling property than the portion 21 facing the channel. Thus, the moisture concentration of the portion 22 of the catalyst layers 203, 205, not facing the channel, may be kept substantially identically to the moisture concentration of the portion 21 facing the channel.

The difference of water-repelling properties between the portion facing the channel and the portion not facing the channel may be measured in various ways. For example, this difference may be expressed using a contact angle to water. In the present invention, the difference of water-repelling properties between the portion facing the channel and the portion not facing the channel may be considered as appropriate when a difference of contact angles to water is 2° or above, preferably 5° or above, more preferably 10° or above, but the present invention is not limited thereto. If the difference of water-repelling properties is too great, reactivity in the catalyst layer may be deteriorated. Thus, the difference of water-repelling properties in the catalyst layer is considered as appropriate when the difference of contact angles is 2° to 20°.

If the first and second catalyst layer forming inkdrops are sprayed to preset locations on the electrolyte membrane or the gas diffusion layer to be adjacent to each other according to the above method, a catalyst layer is formed. If the first and second catalyst layer forming inkdrops are repeatedly sprayed onto the formed catalyst layer according to the above method, it is possible to obtain a catalyst layer with a desired thickness.

After the ink spraying process is completed, a drying process may be further executed to dry the catalyst layer. In this case, to promote the drying process of sprayed inkdrops, ink may be sprayed in a thermally treated state during the ink spraying process.

In the method for making a cathode for a fuel cell according to the present invention as described above, fine inkdrops may be sprayed to desired locations by means of the ink jet spraying, so it is possible to control positions of matters included in the ink in the catalyst layer. Thus, though a fuel cell have various channel patterns, the first and second catalyst layer forming inks according to the present invention can be sprayed to the portion facing a channel or the portion not facing a channel by location adjustment, so it is possible to control regions with different water-repelling properties in the catalyst layer. In addition, it would be easily expected without any experiment by those having ordinary skill in the art that an amount of moisture in an electrode can be easily controlled by adjusting moisture concentration of the catalyst layer since the catalyst layer may have different water-repelling properties according to the channel location.

The electrode for a fuel cell according to the present invention may be formed on an electrolyte membrane or a gas diffusion layer, so it may be used for manufacturing a membrane electrode assembly for a fuel cell according to the present invention.

Figure 2:
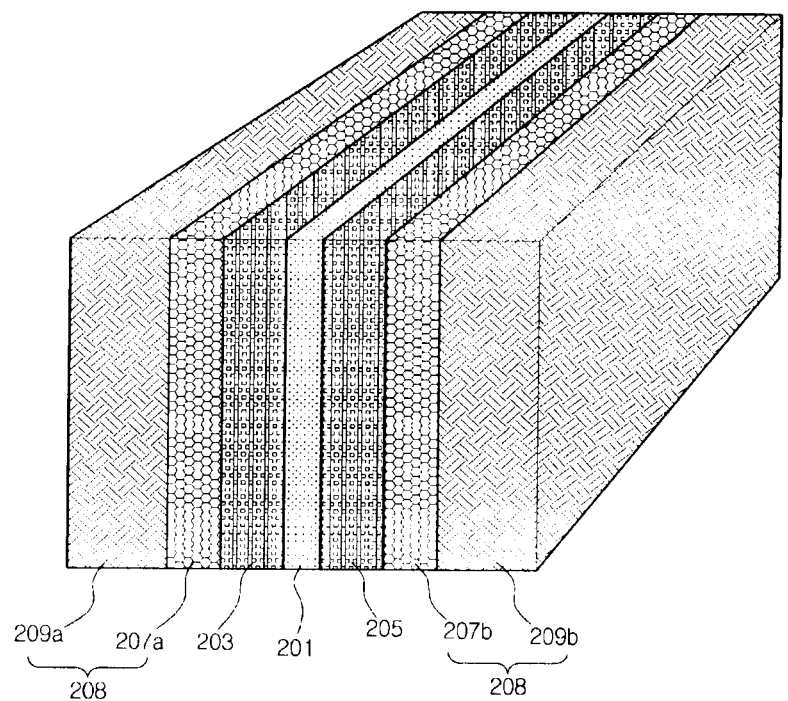
FIG. 2 is a schematic view illustrating a general configuration of a membrane electrode assembly for a fuel cell.

As shown in FIG. 2, a membrane electrode assembly for a fuel cell according to the present invention includes an electrolyte membrane 201; and an anode and a cathode located at opposite sides of the electrolyte membrane 201. The anode and cathode may include a gas diffusion layer 208 and catalyst layers 203 and 205, respectively. The gas diffusion layer 208 for a fuel cell according to the present invention may include substrates 209a and 209b and microporous layers 207a and 207b formed on one side of the substrates 209a and 209b, respectively.

The electrolyte membrane employed in the present invention may adopt any electrolyte membrane used in the art, for example any one polymer selected from the group consisting of perfluorosulfonic acid polymer, hydrocarbon-based polymer, polyimide, polyvinylidene fluoride, polyethersulfone, polyphenylene sulfide, polyphenylene oxide, polyphosphazine, polyethylene naphthalate, polyester, doped polybenzimidazol, polyether ketone, polysulfone, and their acids and bases, but the present invention is not limited thereto.

The gas diffusion layer employed in the present invention may adopt any gas diffusion layer used in the art, and typically may include a conductive substrate made of any one selected from the group consisting of carbon paper, carbon cloth and carbon felt. The gas diffusion layer may further include a microporous layer formed on one side of the conductive substrate, and the microporous layer may be made of a carbon-based material or a fluorine-based resin.

The carbon-based material may be any one selected from the group consisting of graphite, carbon black, acetylene black, denka black, ketjen black, activated carbon, mesoporous carbon, carbon nanotube, carbon nano fiber, carbon nano horn, carbon nano ring, carbon nano wire, fullerene (C60) and Super-P, or their mixtures, but the present invention is not limited thereto.

The fluorine-based resin may be any one selected from the group consisting of poly-tetrafluoroethylene, polyvinylidene fluoride (PVdF), polyvinyl alcohol, cellulose acetate, polyvinylidene fluoride-hexafluoropropylene copolymer (PVdF-HFP) and styrene-butadiene rubber (SBR), or their mixtures, but the present invention is not limited thereto.

At this time, the catalyst layer is formed on the microporous layer of the gas diffusion layer.

Figure 6:
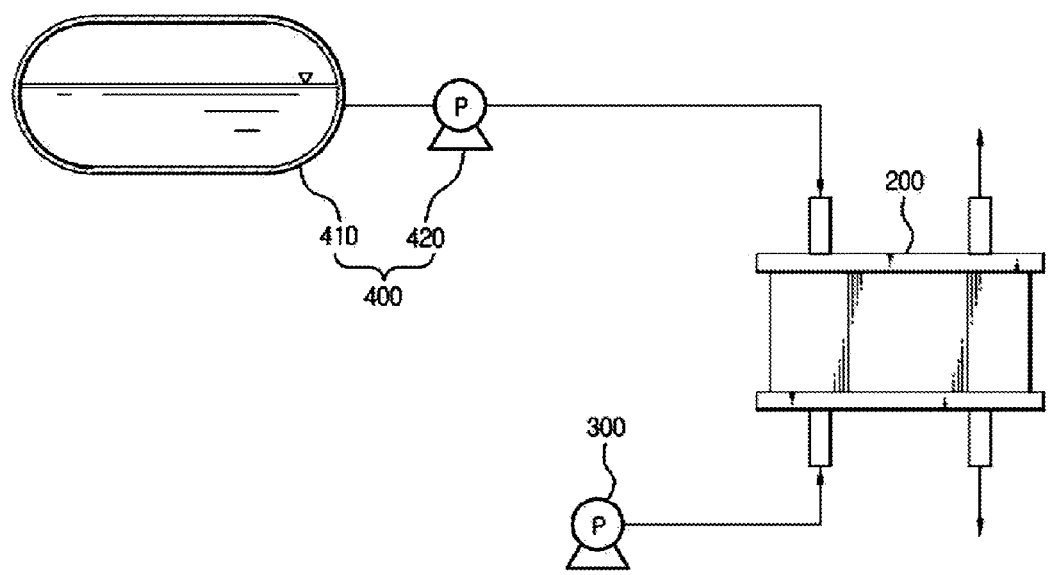
FIG. 6 is a schematic view illustrating a fuel cell according to an embodiment of the present invention.

The present invention also provides a fuel cell including the membrane electrode assembly explained above. FIG. 6 is a schematic view illustrating a fuel cell according to an embodiment of the present invention. Referring to FIG. 6, the fuel cell of the present invention includes a stack 200, a fuel providing unit 400 and an oxidant providing unit 300.

The stack 200 includes at least one membrane electrode assembly of the present invention, and in the case that at least two membrane electrode assemblies are included, the stack 200 includes a separator interposed between the membrane electrode assemblies. The separator prevents the membrane electrode assemblies from being electrically connected to each other, and transfers a fuel and an oxidant provided from the external to the membrane electrode assemblies.

The fuel providing unit 400 provides a fuel to the stack 200, and may include a fuel tank 410 for storing a fuel and a pump 420 for providing the fuel stored in the fuel tank 410 to the stack 200. The fuel may be gaseous or liquid hydrogen or hydrocarbon fuel, and the hydrocarbon fuel may be, for example, methanol, ethanol, propanol, butanol or natural gas.

The oxidant providing unit 300 provides an oxidant to the stack 200. The oxidant is typically oxygen, and the oxidant providing unit 300 may be a pump for pumping oxygen or air.

INDUSTRIAL APPLICABILITY

The cathode for a fuel cell according to the present invention may control water-repelling property of the catalyst layer differently according to locations, so it is possible to keep an amount of moisture in an electrode in a suitable way and to restrain generation of flooding, thereby improving the performance of the cell.

The invention claimed is:

1. A method of preparing a cathode for a fuel cell, comprising:
   (S1) preparing a first catalyst layer forming ink and a second catalyst layer forming ink; and
   (S2) spraying the first and second catalyst layer forming inks to an electrolyte membrane or a gas diffusion layer by ink jet spraying such that the first catalyst layer forming ink is sprayed to a portion that faces a channel defined therein and the second catalyst layer forming ink is sprayed to a portion that does not face the channel,
   wherein the first catalyst layer forming ink consists of a metal catalyst or a metal catalyst on a carbon-based support; a polymer ionomer; and a solvent, and
   wherein the second catalyst layer forming ink consists of a metal catalyst or a metal catalyst on a carbon-based support; a polymer ionomer; a hydrophobic polymer-based water-repelling enhancer selected from the group consisting of polychlorotrifluoroethylene and fluorinated ethylene propylene copolymer; and a solvent.

2. The method of preparing a cathode for a fuel cell according to claim 1,
   wherein a weight ratio of the metal catalyst to the hydrophobic polymer-based water-repelling enhancer is 1:0.02 to 0.40.

3. The method of preparing a cathode for a fuel cell according to claim 1,
   wherein the metal catalyst is any one selected from the group consisting of platinum, ruthenium, osmium, platinum-ruthenium alloy, platinum-osmium alloy, platinum-palladium alloy and platinum-transition metal alloy, or their mixtures.

4. The method of preparing a cathode for a fuel cell according to claim 1,
   wherein the carbon-based support is any one selected from the group consisting of graphite, carbon black, acetylene black, denka black, ketjen black, activated carbon, mesoporous carbon, carbon nanotube, carbon nano fiber, carbon nano horn, carbon nano ring, carbon nano wire, fullerene (C60) and Super-P, or their mixtures.

5. The method of preparing a cathode for a fuel cell according to claim 1,
   wherein the polymer ionomer is nafion ionomer or sulfonated polytrifluo-rostyrene.

6. The method of preparing a cathode for a fuel cell according to claim 1,
   wherein the solvent is any one selected from the group consisting of water, butanol, isopropanol, methanol, ethanol, n-propanol, n-butyl acetate and ethylene glycol, or their mixtures.

7. The method of preparing a cathode for a fuel cell according to claim 1,
   wherein the ink spraying process is executed in a thermally treated state.

8. The method of preparing a cathode for a fuel cell according to claim 1,
   wherein, after the cathode is made, a difference of contact angles to water between the portion facing the channel and the portion not facing the channel is 2° to 20°.

9. The method of preparing a cathode for a fuel cell according to claim 1,
   wherein the electrolyte membrane is any one polymer selected from the group consisting of perfluorosulfonic acid polymer, hydrocarbon-based polymer, polyimide, polyvinylidene fluoride, polyethersulfone, polyphenylene sulfide, polyphenylene oxide, polyphosphazine, polyethylene naphthalate, polyester, doped polybenzimidazol, polyether ketone, polysulfone, and their acids and bases.

10. The method of preparing a cathode for a fuel cell according to claim 1,
    wherein the gas diffusion layer includes a conductive substrate selected from the group consisting of carbon paper, carbon cloth and carbon felt, a carbon-based material and a fluorine-based resin.

* * * * *